United States Patent
Tran et al.

(10) Patent No.: US 6,253,319 B1
(45) Date of Patent: Jun. 26, 2001

(54) METHOD AND APPARATUS FOR RESTORING A COMPUTER TO A CLEAR CMOS CONFIGURATION

(75) Inventors: Robin T. Tran; Michael A. Wright; Michael R. Durham, all of Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/177,272

(22) Filed: Oct. 22, 1998

(51) Int. Cl.[7] .................................................. G06F 9/445
(52) U.S. Cl. ............................... 713/1; 713/100; 710/131
(58) Field of Search ..................................... 713/1, 2, 100; 709/220, 221, 222; 710/36, 129, 131, 104

(56) References Cited

U.S. PATENT DOCUMENTS

| | | | |
|---|---|---|---|
| 4,099,247 | * 7/1978 | Mikada et al. | 708/160 |
| 4,572,143 | 2/1986 | Umesaki et al. | 123/479 |
| 4,965,835 | * 10/1990 | Hochstein | 381/110 |
| 5,065,104 | * 11/1991 | Kusko et al. | 324/508 |
| 5,473,775 | 12/1995 | Sakai et al. | 395/700 |
| 5,534,804 | * 7/1996 | Woo | 327/143 |
| 5,542,077 | 7/1996 | Johnson et al. | 395/750 |
| 5,634,073 | 5/1997 | Collins et al. | 395/825 |
| 5,659,712 | 8/1997 | Divivier et al. | 395/481 |
| 5,694,020 | * 12/1997 | Lang et al. | 320/13 |
| 5,701,492 | * 12/1997 | Wadsworth et al. | 717/11 |
| 5,812,859 | * 9/1998 | Kamimaki et al. | 713/300 |
| 5,842,012 | * 11/1998 | Walker et al. | 713/2 |
| 5,845,136 | * 12/1998 | Babcock | 713/300 |
| 5,892,943 | * 4/1999 | Rockford et al. | 713/2 |
| 5,982,942 | * 4/1999 | Ohnishi et al. | 375/651 |
| 5,987,536 | * 11/1999 | Johnson et al. | 710/36 |
| 6,111,922 | * 9/2000 | Kim | 713/1 |
| 6,119,225 | * 9/2000 | Kim | 713/1 |
| 6,158,020 | * 12/2000 | Locker et al. | 714/13 |

* cited by examiner

*Primary Examiner*—Thomas Lee
*Assistant Examiner*—Rijue Mai
(74) *Attorney, Agent, or Firm*—Conley, Rose & Tayon, P.C.; Michael F. Heim; Daniel J. Krueger

(57) ABSTRACT

A computer system is provided with a multifunction power switch. In addition to the normal function of turning the computer on and off, the power switch has the additional function of clearing CMOS memory. In one embodiment, pressing the power switch while the computer is connected to a power source turns the computer on and off, and when the computer is disconnected from the power source, the CMOS memory may be cleared by pressing and holding the power switch for a predetermined time delay, e.g. 10 seconds. As a precaution against malicious clearing of CMOS memory, activation of this feature may be disabled as long as the computer cover is closed. In this case, the computer cover would have to be at least partially removed before the power button is pressed and held to clear CMOS. An LED may be provided which illuminates to indicate the success of the CMOS clearing operation. Adding this functionality to the power button advantageously simplifies an otherwise difficult process for restoring a computer with corrupted CMOS to a bootable configuration.

3 Claims, 3 Drawing Sheets

METHOD AND APPARATUS FOR RESTORING A COMPUTER TO A CLEAR CMOS CONFIGURATION

BACKGROUND OF THE INVENTION

1. Field of the Invention

The present invention relates generally to making computer systems more user-friendly, and in particular, to a method and apparatus for conveniently clearing the basic input/output system (BIOS) parameter settings from a nonvolatile memory in a computer.

2. Description of Related Art

Personal computers include a basic input/output system (BIOS) stored in nonvolatile memory. The BIOS is a set of instructions which are executed to conduct the system initialization and to provide control of low level functions in the computer. Normally, the nonvolatile memory is an electrically-erasable read-only memory (EEPROM) chip, which allows the BIOS to be updated through software control. This is commonly called a "flash" BIOS. Under normal circumstances, the BIOS ROM is permanent and there is normally no need to deal with it.

In addition to the BIOS ROM, most conventional computer systems include a small CMOS memory and real time clock (RTC) unit. This component keeps track of the time and date, and stores BIOS configuration parameters when the computer was turned off, so that this information is readily available when the computer is turned back on. To preserve this information while the computer is off, this component also includes a low-power, long life battery.

The acronym CMOS stands for "Complementary Metal Oxide Semiconductor", and generally refers to one type of technology used to make semiconductor devices (i.e. integrated circuits) such as processors, chipset chips, DRAM, etc. Devices constructed using CMOS technology advantageously require very little power compared to other semiconductor technologies. Consequently, CMOS technology is a natural choice for implementing the memory and RTC unit so that the amount of power required from the battery is minimal, and the battery would last a longer. This memory came to be called just "CMOS", since in the early days of personal computer development most parts of the computer did not use CMOS. Although modem processors are typically made entirely with CMOS technology, "CMOS" by itself usually still refers to the BIOS settings memory.

The information stored by the CMOS memory typically includes the type of floppy disk drive, hard disk settings, the amount of memory, clock speeds, wait states, passwords, initial boot drive selection, and other configuration parameters. The BIOS directs the processor to retrieve this information to make the boot-up process more efficient. The CMOS used to be relatively small, about 64 or 128 bytes. As the complexity of computers has increased, the number of configuration parameters has increased. To keep pace with the increased number of parameters, the CMOS has been expanded (e.g. to 2048 bytes) to allow storage of additional parameters such as power management configuration parameters and resource assignments for Plug and Play systems. The increased number of parameters has increased the likelihood of an incorrect parameter being present, whether due to faulty user entry or to corruption of the memory contents. This is of utmost concern since the presence of an error in CMOS may render the computer unbootable, and this error may not be rectified by simply re-booting the computer due to the nonvolatile nature of the CMOS memory.

Since it in not uncommon for computer systems to develop incorrect or corrupted CMOS data, system designers have developed some techniques to clear CMOS memory. Certain few versions of BIOS will clear the CMOS settings if the <Insert> key on the keyboard is held down by the user while the computer is performing its boot process. More commonly, computer manufacturers provide a jumper on the "motherboard" (the main circuit board in the computer) that connects the battery to the CMOS memory. To clear the CMOS memory, the user must unplug the computer, open the case, locate the jumper and remove the jumper and thereby disconnect the battery from the CMOS memory. Without power, the CMOS memory will eventually lose all the stored information. This time period may be relatively lengthy because stray capacitance in the system may need to completely discharge before the CMOS memory clears. To speed up the process, some manufacturers provide a second jumper setting to ground the positive power supply input to the CMOS memory. In this case, the jumper is moved from a first setting to the second setting, left there for 30 seconds, and then replaced to the first setting. Grounding the positive power supply input discharges stray capacitance at a much higher rate.

Most computer users find it undesirable, if not frustrating, to open the computer case, to locate a jumper on the motherboard and to remove and replace the jumper. Further, if the user calls for technical assistance, it is very difficult for a computer support person to guide a novice user through this process over the telephone. Providing a CMOS-memory-clear feature through BIOS detection of a key-press may become infeasible as the multitude of alternative input devices and new keyboard configurations become popular. Pointer devices, speech recognition, and touch-sensitive screens may supplant the standard keyboard and require BIOS software to access CMOS prior to detecting the key-press that indicates the contents of CMOS should be ignored and erased. Consequently, a convenient way of clearing CMOS is desired.

SUMMARY OF THE INVENTION

Accordingly, there is provided herein a computer system having a multifunction power switch. In addition to the normal function of turning the computer on and off, the power switch has the additional finction of clearing CMOS memory. In one embodiment, pressing the power switch while the computer is connected to a power source turns the computer on and off, and when the computer is disconnected from the power source, the CMOS memory may be cleared by pressing and holding the power switch for a predetermined time delay, e.g. 10 seconds. As a precaution against malicious clearing of CMOS memory, activation of this feature may be disabled as long as the computer cover is closed. In this case, the computer cover would have to be at least partially removed before the power button is pressed and held to clear CMOS. An LED may be provided which illuminates to indicate the success of the CMOS clearing operation. Adding this functionality to the power button advantageously simplifies an otherwise difficult process for restoring a computer with corrupted CMOS to a bootable configuration.

BRIEF DESCRIPTION OF THE DRAWINGS

A better understanding of the present invention can be obtained when the following detailed description of the preferred embodiment is considered in conjunction with the following drawings, in which.

Figure 1:
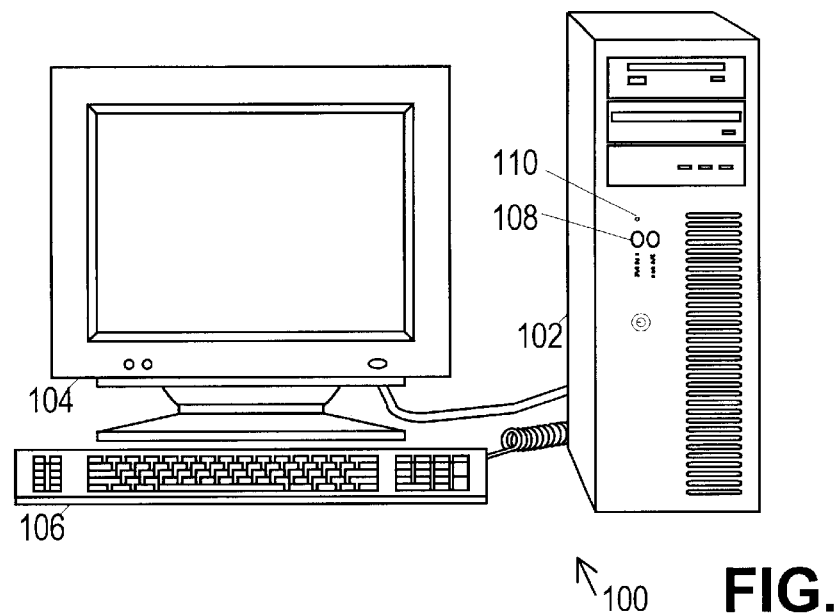
FIG. 1 shows a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF THE PREFERRED EMBODIMENTS

Turning now to the figures, FIG. 1 shows a computer system 100 in accordance with the preferred embodiment comprising a computer chassis 102 coupled to a display device 104 and a user input device 106. The computer chassis 102 preferably has a power button 108 and may also have a power indicator 110 such as a light emitting diode (LED). When the power button 108 is momentarily pressed, power indicator 110 illuminates and computer system 100 boots up. Pressing power button 108 a second time preferably places the computer system 100 in an OFF or SLEEP state.

Figure 2:
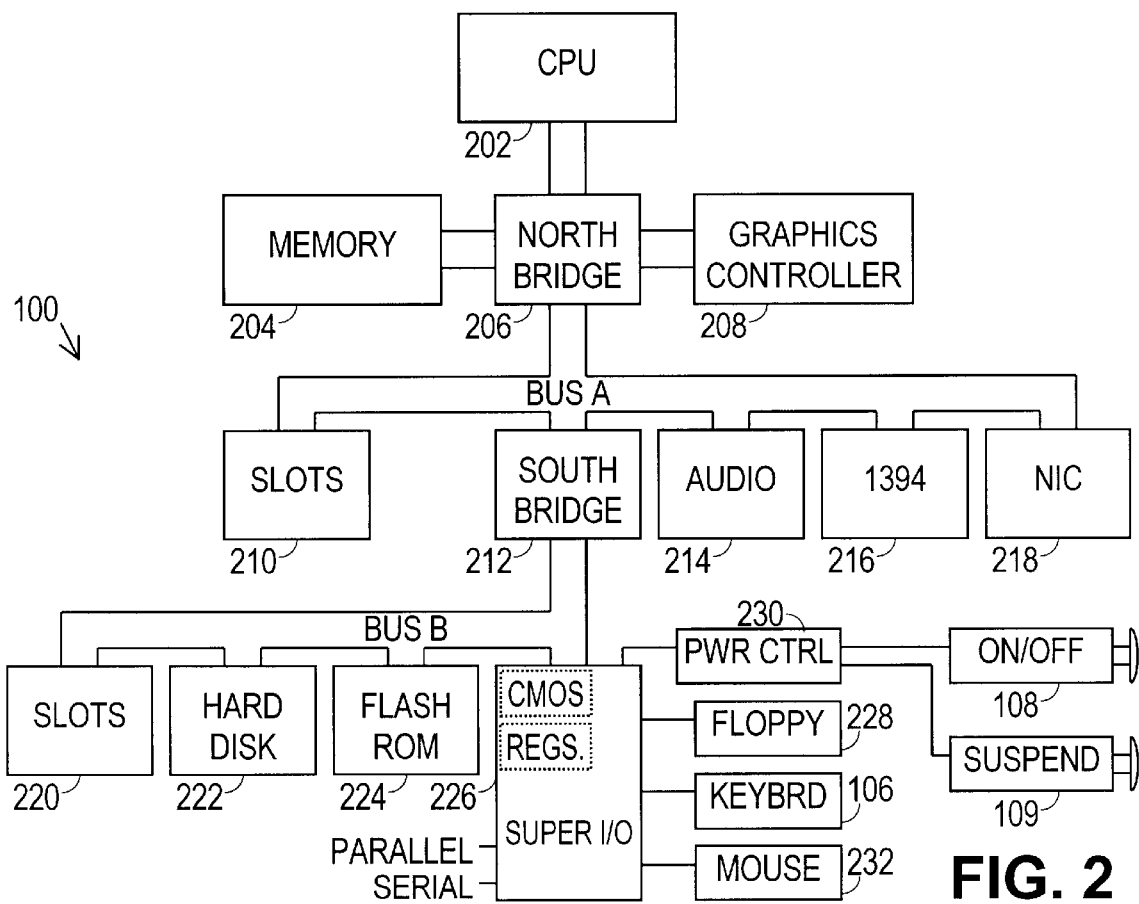
FIG. 2 is a functional block diagram of the computer system of FIG. 1.

FIG. 2 illustrates an exemplary architecture of computer system 100. Although the system 100 can be implemented with many other architectures, the embodiment shown in FIG. 2 is presented for illustrative purposes. Computer system 100 includes a CPU 202 coupled to a bridge logic device 206 via a CPU bus. The bridge logic device 206 is sometimes referred to as a "North bridge" for no other reason than it often is depicted at the upper end of a computer system drawing. The North bridge 206 also couples to a main memory array 204 by a memory bus, and may further couple to a graphics controller 208 via an accelerated graphics port (AGP). The North bridge 206 couples CPU 202, memory 204, and graphics controller 208 to the other peripheral devices in the system through a primary expansion bus (BUS A) which may be implemented as a peripheral component interconnect (PCI) bus or an extended industry standard architecture (EISA) bus. Various components that comply with the communications protocol and electrical requirements of BUS A may reside on this bus, such as an audio device 214, a IEEE 1394 interface device 216, and a network interface card (NIC) 218. These components may be integrated onto the motherboard or they may be plugged into expansion slots 210 that are connected to BUS A.

If other secondary expansion buses are provided in the computer system, as is typically the case, another bridge logic device 212 is used to couple the primary expansion bus (BUS A) to a secondary expansion bus (BUS B). This bridge logic 212 is sometimes referred to as a "South bridge" reflecting its location vis-a-vis the North bridge 206 in a typical computer system drawing. An example of such bridge logic is described in U.S. Pat. No. 5,634,073, assigned to Compaq Computer Corporation. Various components that understand the bus protocol of BUS B may reside on this bus, such as hard disk controller 222, Flash ROM 224, and Super I/O controller 226. Slots 220 may also be provided for plug-in components that comply with the protocol of BUS B. Flash ROM 224 stores the system BIOS that is executed by CPU 202 during system initialization.

The Super Input/Output (Super I/O) controller 226 typically interfaces to input/output devices such as a keyboard 106, a mouse 232, a floppy disk drive 228, a parallel port, a serial port, and sometimes a power controller 230 and various other input switches such as a power switch 108 and a suspend switch 109. In one embodiment, the Super I/O controller 226 includes control registers (REGS.) for configuring the input/output devices and for reporting their status. The Super I/O controller 226 preferably has the capability to handle power management functions such as reducing or terminating power to components such as the floppy drive 228, and blocking the clock signals that drive components such as the bridge devices 206, 212 thereby inducing a sleep mode in the expansion buses. The Super I/O controller 226 may further assert System Management Interrupt (SMI) to indicate special conditions pertaining to input/output activities such as sleep mode.

Super I/O controller 226 may include battery-backed CMOS memory for storing BIOS configuration parameters for system 100, and may further include a counter/timer and a Real Time Clock (RTC). The counter/timer may be used to track the activities of certain components such as the hard disk 222 and the primary expansion bus, and induce a sleep mode or reduced power mode after a predetermined time of inactivity. The Super I/O controller 226 may also induce a low-power suspend mode if the suspend switch 109 is pressed, in which the power is completely shut off to all but a few selected devices. Exempted devices might include the Super I/O controller 226 itself and NIC 218. When Super I/O controller 226 senses a power switch closure, it asserts a system POWER_ON signal and initiates system boot-up. During system boot-up, the CPU 202 retrieves the BIOS from Flash ROM 224 and executes the BIOS. The BIOS stores system configuration parameters in CMOS, and retrieves these parameters to initialize and configure various system components to place the system in readiness for operation by a user.

During system initialization, the BIOS typically provides the user an opportunity to enter a "setup" program, in which the various system configuration parameters may be viewed and modified by the user. In order that the user might be provided with an easy-to-use interface, the setup program doesn't run until after the user input device 106 and the display device 104 have been initialized. Other components may also be configured by the BIOS prior to the execution of the setup program. Consequently, it is entirely possible for an incorrect configuration parameter to prevent the system from being properly configured, to prevent the system from booting and to prevent the user from accessing the setup program whereby the situation might be rectified. In these circumstances, it is necessary to "erase" the incorrect parameter(s) from CMOS, even at the expense of losing the rest of the stored configuration parameters. Typically this is done by removing the power from the CMOS memory, either by removing the battery while the computer is unplugged, or by disconnecting a jumper. When power is restored to the CMOS memory, a "CMOS invalid" bit is automatically set (typically in one of the Super I/O controller's control registers) to indicate that a loss of power has occurred. The BIOS examines this bit before using any of the configuration parameters from the CMOS memory, and if the bit is set, the BIOS uses default values to boot the computer and may automatically run the setup program to prompt the user for new parameter settings.

It is noted that setting the CMOS-invalid bit effectively "clears" the CMOS memory whether or not the stored information is lost, since any information held in the CMOS memory is ignored if this bit is set. Some BIOSs may actually erase the CMOS after determining that this bit is set, and perhaps store default configuration parameters in the CMOS memory. In other implementations, the CMOS-invalid bit may be used to disconnect the CMOS power supply and allow the stored information to be lost. Regardless, the CMOS memory may be said to be cleared when this bit is set. The BIOS may reset this bit once new configuration parameters are stored in memory.

Figure 3:
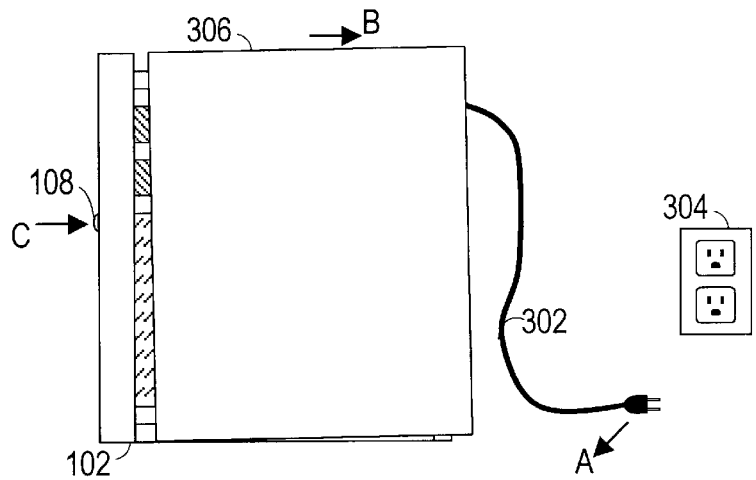
FIG. 3 illustrates a method for clearing a computer's CMOS memory.

The effort involved in opening the case, locating, removing, and replacing the jumper is non-trivial, particularly for a novice unfamiliar with internal computer components and motherboards in particular. Accordingly, FIG. 3 shows a new method for clearing a computer's CMOS memory. A computer chassis 102 having a case cover 306 is connected by a cable 302 to an external power source 304. To clear the CMOS memory, a user (a) disconnects the computer 102 from the external power source 304, (b) opens the case cover 306, and (c) presses the power button 108. Where computer 102 is a portable computer, a similar method may be used to clear the CMOS. In this case, step (a) includes disconnecting any internal power sources such as a battery. Step (b) is preferably provided for security reasons, and may optionally be eliminated for environments in which malicious clearing of stored parameter settings is unlikely. Where step (b) is required, it is preferably unnecessary to remove case cover 306. Rather, the case cover 306 may preferably be opened only slightly, but sufficiently far to be reasonably sure that the user is authorized to access the computer internals. To prevent accidental clearing of the CMOS memory, in step (c) the user may be required to hold the power button closed for a predetermined time delay before the CMOS is cleared. The predetermined delay may range from 3 to 30 seconds, and may preferably be about 5 or 10 seconds.

It is noted that the power button 108 is multifunctional. Pressing power button 108 while the computer is connected to a power source initiates a boot-up sequence. Pressing power button 108 while the computer is disconnected from the power source clears the CMOS memory.

Figure 4:
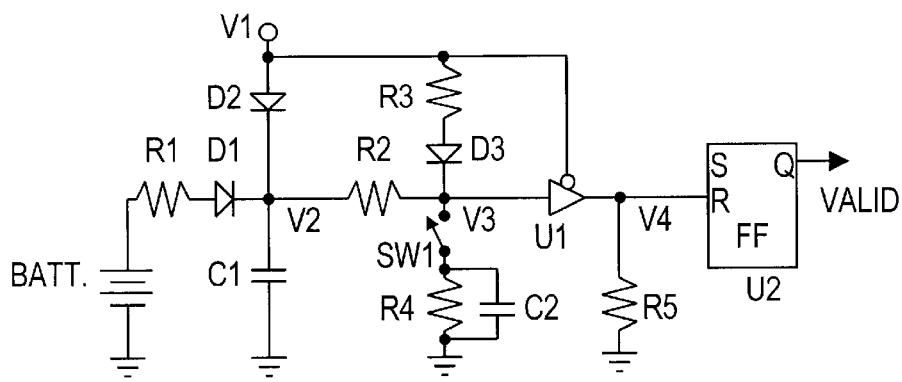
FIG. 4 is a schematic of one embodiment of a circuit for resetting a computer's CMOS memory.

FIG. 4 is a schematic diagram of a first embodiment of a circuit that supports the method of FIG. 3. The circuits of FIGS. 4–7 are preferably included in power controller 230 of computer system 100 with other power button circuitry that is used to initiate assertion of a system POWER_ON signal and subsequent boot-up of the system 100. This other circuitry (not specifically shown) is coupled to the power button 108 to detect switch closure and responsively generate a signal to turn the system 100 on or off. The POWER_ON signal is coupled to various system components including the CPU 202, and after momentary assertion of the POWER_ON signal, CPU 202 is configured to enter an initial state, retrieve the BIOS, and begin initializing the computer.

Node V1 has an auxiliary voltage which preferably is approximately 3.3 volts whenever the computer 102 is connected to the external power source 304, and which becomes grounded or becomes a high-impedance source (i.e. an open circuit) when the computer 102 is disconnected from external power source 304. The node labeled V2 couples to V1 by a diode D2 and to a battery by a resistor R1 and diode D1. Node V2 also coupled to ground by a capacitor C1. The voltage at V2 is expected to be the greater of V1 and the battery voltage (typically 2.9 volts). V2 preferably is the power supply voltage for the CMOS memory and the real time clock (RTC). The node labeled V3 couples to one terminal of power button SW1. Node V3 couples to V2 by a pull-up resistor R2, and preferably couples to node V1 by a series combination of a pull-up resistor R3 and a diode D3.

Pressing power button SW1 couples node V3 to ground via resistor R4 in parallel with capacitor C2. Consequently, pressing power button SW1 momentarily pulls node V3 to approximately 0 volts, after which V3 exponentially decays back up to its initial voltage steady state voltage due to the charging action of capacitor C2. The RC time constant for R4 and C2 is preferably less than 500 ms, and serves to debounce the power button SW1 and prevent accidental re-triggering. The exponential pulse on node V3 preferably is detected by a circuit portion (not specifically shown) for the purpose of turning the computer on and off.

The node labeled V4 couples to node V3 by a tri-state buffer U1. Node V4 also couples to ground by a pull-down resistor R5. An enable input to tri-state buffer U1 couples to node V1 and U1 is held in a high-impedance state when the voltage on node V1 is high. When node V1 is open or grounded, buffer U1 drives node V4 high when node V3 is high and drives node V4 low when node V3 is low. Driving node V4 high resets flip-flop U2 (which preferably is an RS flip-flop or any other suitable type of logic device), which holds a "CMOS valid" bit. Resetting this bit clears the CMOS memory. Once flip-flip U2 has been reset, the power may be reconnected and the computer turned on. The CMOS valid bit is preferably visible to CPU 202 as a bit in a control register of Super I/O controller 226. As the computer boots, the BIOS will determine if the CMOS valid bit is set, and will use the contents stored in CMOS memory only if this bit is set. Otherwise, new or default values will be substituted for the configuration parameters normally stored in CMOS.

Exemplary component values for the components of FIG. 4 are:

| Name | Value | Name | Value | Name | Value | Name | Value |
| --- | --- | --- | --- | --- | --- | --- | --- |
| R1 | 2.2 kΩ | R2 | 10 kΩ | R3 | 1 kΩ | R4 | 560 kΩ |
| R5 | 4.7 kΩ | C1 | 47 µF | C2 | 0.1 µF | | |

Although specific component and voltage values have been disclosed, these values are provided for illustrative purposes and are not intended to limit the scope of the invention.

Figure 5:
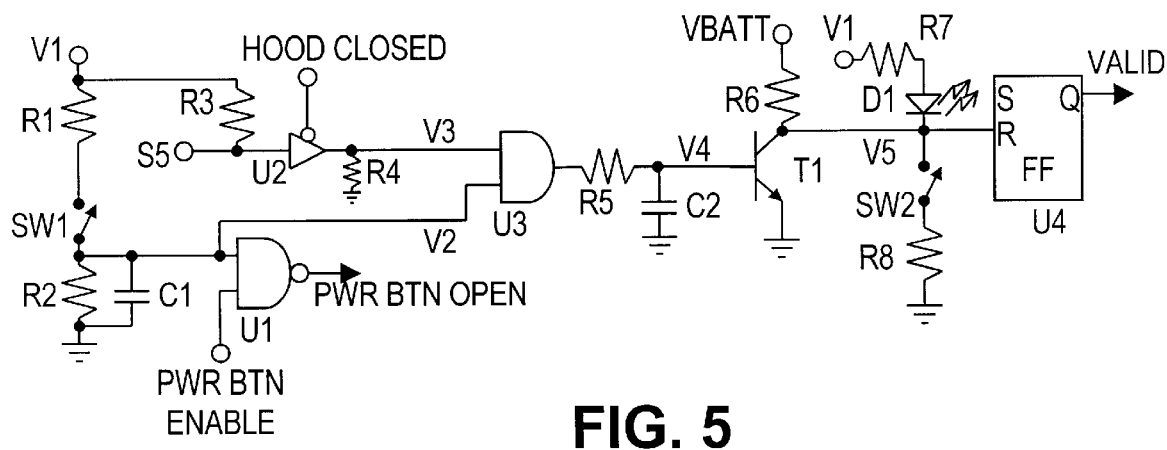
FIG. 5 is a schematic of a second embodiment of the resetting circuit.

FIG. 5 is a schematic diagram of a second embodiment of a CMOS-clearing circuit that supports an alternate method of clearing the CMOS memory. For this embodiment, the computer is not disconnected from the power supply, but the case is opened and the power button is pressed for a predetermined time period.

Again, V1 is the auxiliary voltage, although in this embodiment the computer remains connected to the power source and thus node V1 is preferably high during the CMOS clearing operation. The node labeled V2 couples to one terminal of power button SW1 and further couples to ground by a resistor R2 in parallel with a capacitor C1. The other terminal of power button SW1 couples to V1 by a pull-up resistor R1. When power button SW1 is pressed and held, the voltage of node V2 exponentially converges to a high voltage due to the charging operation of capacitor C1. A NAND gate U1 asserts a POWER_BUTTON_OPEN signal while node V2 is low, and if a POWER_BUTTON_ENABLE signal is asserted, gate U1 de-asserts the POWER_BUTTON_OPEN signal when node V2 is high. FIG. 5 also shows a signal S5, which is output by power management circuitry of power controller 230 (not specifically shown) of computer 100. The power management circuitry preferably places signal S5 in a high-impedance state when the computer enters a "deep sleep" mode. The "deep sleep" mode is the minimum-power, OFF state for the computer while it is plugged in. The user places the computer into the deep-sleep mode by pressing and holding the power button for four seconds. A pull-up resistor R3 coupling S5 to V1 causes S5 to go high when the computer enters the deep-sleep mode.

The node labeled V3 couples to ground by a pull-down resistor R4, and couples to S5 via a tri-state buffer U2. Tri-state buffer U2 is disabled (placed in a high-impedance state) when its enable input, a HOOD_CLOSED signal, is asserted. The HOOD_CLOSED signal may be provided by a pair of contacts or a microswitch that is closed or opened when the case cover 306 is put in place. When the case cover 306 is opened slightly, the HOOD_CLOSED signal is de-asserted, and the buffer U2 drives node V3 high when S5 is high, and drives node V3 low when S5 is low. If the case cover is open when the user presses and holds the power button for 4 seconds, nodes V2 and V3 are both driven high, and AND gate U3 begins charging capacitor C2.

Node V4 couples to the output of AND gate U3 by a resistor R5 and couples to ground through a capacitor C2. As capacitor C2 charges, V4 goes high and transistor T1 starts conducting. The node labeled V5 couples to a battery supply voltage VBATT by a pull-up resistor R6, and couples to node V1 by a pull-up resistor R 7 and an LED D1. Node V5 is further coupled to ground via transistor T1, so when T1 starts to conduct, V5 is pulled low. Pulling V5 low resets flip-flop U4 which drives the CMOS-valid bit as described previously.

In one embodiment, node V5 may optionally be further coupled to ground by a switch SW2 and a resistor R8. Switch SW2 may be a jumper or button mounted on the motherboard for clearing CMOS in accordance with the old method. The user may observe that the CMOS-valid bit has been reset when LED D1 illuminates.

Exemplary impedance values for the components of FIG. 5 are:

| Name | Value | Name | Value | Name | Value | Name | Value |
|---|---|---|---|---|---|---|---|
| R1 | 1 kΩ | R2 | 560 kΩ | R3 | 10 kΩ | R4 | 10 kΩ |
| R5 | 47 kΩ | R6 | 47 kΩ | R7 | 100 Ω | R8 | 100 Ω |
| C1 | 0.1 µF | C2 | 47 µF | | | | |

Although specific component and voltage values have been disclosed, these values are provided for illustrative purposes and are not intended to limit the scope of the invention.

Figure 6:
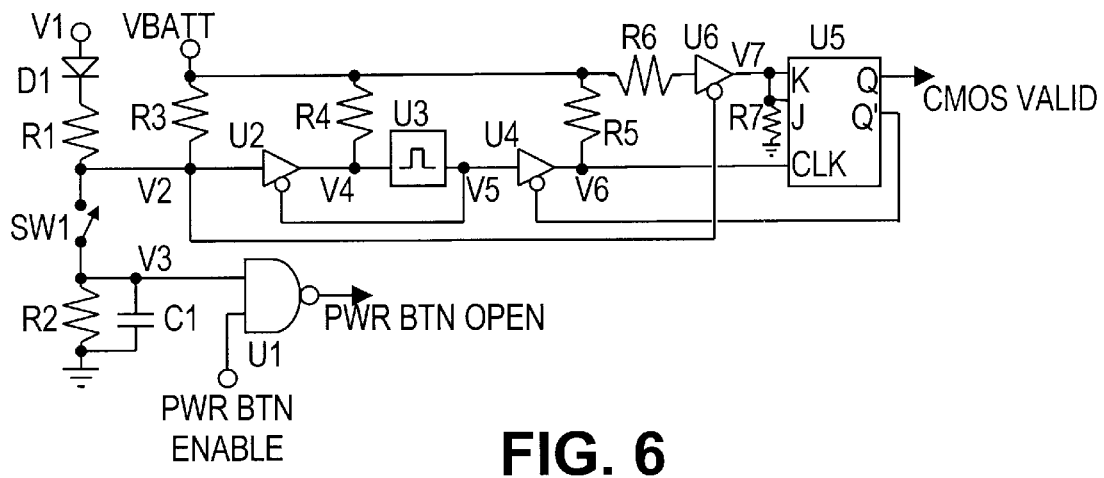
FIG. 6 is a schematic of a third embodiment of the resetting circuit.

FIG. 6 is a schematic diagram of a third embodiment of a CMOS-clearing circuit that supports the method of FIG. 3. The voltage at node V1 is the auxiliary voltage as described in reference to FIG. 4, and the voltage at node VBATT is the battery supply voltage (illustratively, 2.9 volts). The node labeled V2 couples to node V1 by series combination of a diode D1 and a pull-up resistor R1, couples to node VBATT by a pull-up resistor R3, and couples to one terminal of power button SW1. The other terminal of power button SW1 is labeled V3 and couples to ground by a resistor R2 in parallel with a capacitor C1. Node V2 is normally high, but if power button SW1 is pressed and held, the voltage at node V2 drops to approximately 0 volts and exponentially converges back to a voltage representing a high logic level, due to the charging action of capacitor C1. NAND gate U1 generates a POWER_BUTTON_OPEN signal in response to the voltage at node V3 and a POWER_BUTTON_ENABLE signal. Node V3 rises with node V2 while power button SW1 is pressed, and if the enable signal is asserted, the POWER_BUTTON_OPEN signal will go low.

The node labeled V4 couples to node VBATT by a pull-up resistor R4 and couples to node V2 by a tri-state buffer U2. The tri-state buffer U2 is normally enabled, so that node V4 is driven low when node V2 goes low, and is driven high when node V2 is high. The node labeled V5 couples to node V4 by a pulse generator U3. Pulse generator U3 generates a positive pulse at V5 when V4 goes low. While V5 is high, it disables tri-state buffer U2 to prevent pulse generator U3 from being re-triggered until after the pulse is completed. The node labeled V6 couples to node VBATT by a pull-up resistor R5 and couples to V5 by a tri-state buffer U4. U4 is normally enabled, so that V6 reflects the value of V5.

The node labeled V7 is coupled to ground by a pull-down resistor R7 and couples to VBATT by a tri-state buffer U6, whose input is coupled to VBATT by a pull-up resistor R6. The enable input of tri-state buffer U6 is coupled to node V2. When V2 is low, the tri-state buffer is enabled, and V7 is high. Conversely, when V2 is high, the tri-state buffer is disabled, and V7 is low.

A J–K flip-flop U5 is used to hold a CMOS VALID bit. Flip-flop U5 has the J and K inputs coupled to node V7, the clock input coupled to node V6, and the inverse of the CMOS VALID output coupled to the enable input of tri-state buffer U4. Normally, the CMOS VALID bit is set. When node V6 goes low as a result of the power button SW1 being pressed, the CMOS VALID bit will be toggled if node V7 high, or remain unchanged if node V7 is low. Consequently, if the button SW1 is released before the downward transition of the clock signal reaches flip-flop U5, V2 is high, U6 is disabled, V7 is low, and the CMOS VALID bit remains unchanged. Conversely, if the button SW1 remains pressed as the downward transition of the clock signal reaches flip-flop U5, the CMOS VALID bit is toggled.

Once the CMOS VALID bit is cleared, the tri-state buffer U4 is disabled to prevent re-triggering of flip-flop U5. Flip-flop U5 includes a set input S (not specifically shown)

which the BIOS can assert via a control register of Super I/O controller 226 to set the bit after new parameters have been written to the CMOS.

Exemplary impedance values for the components of FIG. 6 are:

| Name | Value | Name | Value | Name | Value | Name | Value |
|---|---|---|---|---|---|---|---|
| R1 | 1 kΩ | R2 | 10 kΩ | R3 | 100 kΩ | R4 | 100 kΩ |
| R5 | 100 kΩ | R6 | 100 kΩ | R7 | 100 kΩ | C1 | 0.1 μF |

Although specific component and voltage values have been disclosed, these values are provided for illustrative purposes and are not intended to limit the scope of the invention.

Figure 7:
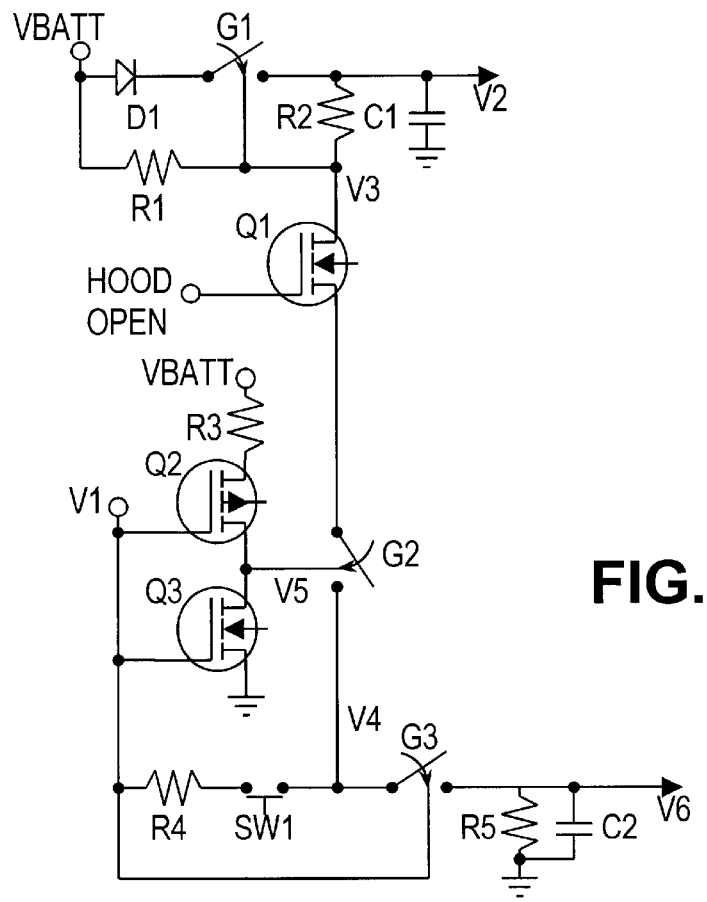
FIG. 7 is a schematic of a fourth embodiment of the resetting circuit.

FIG. 7 shows a fourth embodiment of a CMOS clearing circuit. The voltage at node V1 is the auxiliary voltage which is high when the computer 102 is connected to the power source 304, and which is coupled to ground when the computer 102 is disconnected from the power source 304. The voltage at node VBATT is the battery voltage. The node labeled V2 couples to node VBATT by a series combination of a diode D1 and a gate G1. Gate G1 is preferably a digitally controlled analog switch with a low ON resistance. The term gate is intended to have a generic meaning of a device that switches between an open-circuit "OFF" state and a conductive or driving (powered buffer) "ON" state. Such a device may be implemented using relays, transistors, or digitally controlled electrical switches of any kind. Gate GI is normally ON.

Node V2 is also coupled to ground by a capacitor C1. Node V2 is preferably the power source for the CMOS memory (not specifically shown). The node labeled V3 couples to a control input of gate G1 couples to node VBATT by pull-up resistor R1 and coupled to node V2 by resistor R2. Node V3 is normally high, causing gate G1 to be normally ON.

The node labeled V4 couples to node V3 by a transistor Q1 in series with a gate G2. Node V4 is further coupled to one terminal of power button SW1, the other terminal of which couples to node V1 by resistor R4. Transistor Q1 is controlled by a HOOD_OPEN signal, and is ON when the HOOD_OPEN signal is asserted. The HOOD_OPEN signal is asserted whenever the cover 306 is not completely closed. Alternatively, the HOOD_OPEN signal is asserted after cover 306 has been opened, and remains asserted even if the cover 306 is closed again prior to a boot. In this instance, the HOOD_OPEN signal may be reset after the next system boot.

Gate G1 is controlled by the node labeled V5. Node V5 couples to node V1 by an inverter configuration Q2, Q3, powered by node VBATT through resistor R3. When node V1 is high, transistor Q3 conducts, node V5 is low, and gate G2 is OFF. Conversely, when node V1 is low, transistor Q2 conducts, node V5 is high, and gate G2 is ON.

Consequently, when the cover 306 is open and the power is disconnected, both transistor Q1 and gate G2 are ON. At this point, if the power button SW1 is pressed and held, node V1 (which is low) couples to node V4 which couples to node V3, and this causes node V3 to be pulled low. Gate G1 is turned OFF, and the CMOS power source voltage on node V2 is drained low through resistor R2. Due to capacitor C1, the voltage of node V2 decays over a period of time (e.g. 5 seconds).

The node labeled V6 is a power button signal voltage. This node couples to ground by a resistor R5 in parallel with a capacitor C2, and further couples to node V4 by gate G3, which is controlled by node V1. When V1 is low (i.e. the power is disconnected), gate G3 is OFF, eliminating an undesired path from node V4 to ground through resistor R5. When node V1 is high, gate G3 is ON, and pressing the power button SW1 causes node V6 to exponentially converge to a high voltage. V6 may be used by the computer for determining when to turn on and off.

Exemplary impedance values for the components of FIG. 7 are:

| Name | Value | Name | Value | Name | Value | Name | Value |
|---|---|---|---|---|---|---|---|
| R1 | 1 MΩ | R2 | 560 kΩ | R3 | 10 kΩ | R4 | 1 kΩ |
| R5 | 560 kΩ | C1 | 4.7 μF | C2 | 0.1 μF | | |

Although specific component and voltage values have been disclosed, these values are provided for illustrative purposes and are not intended to limit the scope of the invention.

The circuit of FIG. 5 supports multiple methods for clearing the CMOS (refer to the description of SW2), and it is recognized that modifications may be made to the other circuits to similarly support other methods for clearing CMOS in addition to the claimed methods. These other methods may include: removing a jumper, or writing to a control register of Super I/O controller 226 to assert an invalidation signal. This invalidation signal may be set by CPU 202. Additionally, the invalidation signal may be set by NIC 218 in response to a remote command delivered via a network. Such modifications do not alter the spirit of the claimed invention.

Hence, various methods for adding a CMOS-clearing functionality to a computer's power button have been disclosed which may advantageously provide system features desirable to both a casual user and a system troubleshooter. Numerous variations and modifications will become apparent to those skilled in the art once the above disclosure is fully appreciated. For example, other circuit implementations may be used to support the described method. It is intended that the following claims be interpreted to embrace all such variations and modifications.

What is claimed is:

1. A multifunction circuit that comprises:
   a power switch having a first terminal and a second terminal, wherein the power switch is a momentary switch that is normally open;
   a first resistor coupled between a positive power source terminal and the first terminal of the power switch;
   an RC circuit coupled between the second terminal of the power switch and a ground voltage, wherein the RC circuit has a time constant of less than 500 ms;
   a first sub-circuit coupled to the second terminal of the power switch, coupled to a positive battery terminal, and configured to generate a signal to invalidate contents of a nonvolatile configuration memory in response to closure of the power switch, wherein said first sub-circuit includes:
      a first gate coupled between the positive battery terminal and a power supply node for the nonvolatile configuration memory;
      an invalidation signal node coupled to a first gate, wherein the first gate becomes an open circuit when the invalidation signal is asserted, and wherein the first gate conducts when the invalidation signal is de-asserted;
      a second gate coupled between the invalidation signal node and the second terminal of the power switch, wherein the second gate is also coupled to the positive power source terminal and configured to become an open circuit when the positive power source terminal is high, and configured to conduct when the positive power source terminal is low.

2. The multifunction circuit of claim 1, further comprising a third gate coupled in series with the second gate between the invalidation signal node and the second terminal of the power switch, wherein the third gate is also configured to receive a hood switch signal and configured to become an open circuit when the hood switch signal indicates that a chassis cover is closed, and is configured to conduct when the hood switch signal indicates that the chassis cover is open.

3. A multifunction circuit that comprises:
- a power switch having a first terminal and a second terminal, wherein the power switch is a momentary switch that is normally open;
- a first resistor coupled between a positive power source terminal and the first terminal of the power switch;
- an RC circuit coupled between the second terminal of the power switch and a ground voltage, wherein the RC circuit has a time constant of less than 500 ms;
- a first sub-circuit coupled to the first terminal of the power switch, coupled to a positive battery terminal, and configured to generate a signal to invalidate contents of a nonvolatile configuration memory in response to closure of the power switch, wherein said first sub-circuit includes:
  - a flip-flop configured to hold a bit indicative of configuration memory content validity; and
  - a gate coupled between the first terminal of the power switch and the flip-flop, wherein the gate is also coupled to the positive power supply terminal and configured to become an open circuit when the positive power supply terminal is high, and configured to conduct when the positive power supply terminal is low,
wherein the flip-flop is configured to change the bit to indicate invalidity of the configuration memory content in response to closure of the power switch while the positive power supply terminal is low.

* * * * *